Oct. 11, 1960 C. Z. LEINKRAM 2,955,386
METHOD OF FORMING A SEAL FOR TUBULAR GLASS ENCLOSURES
Filed Dec. 4, 1956
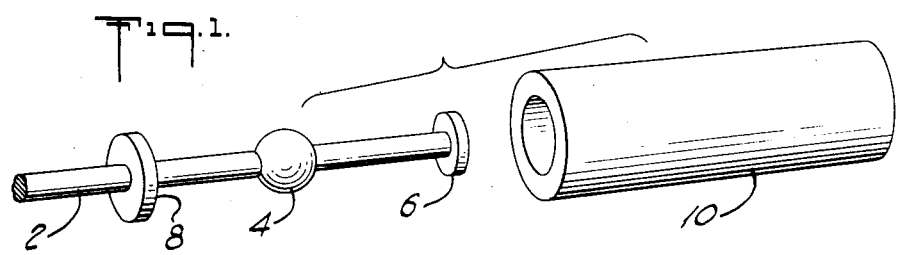
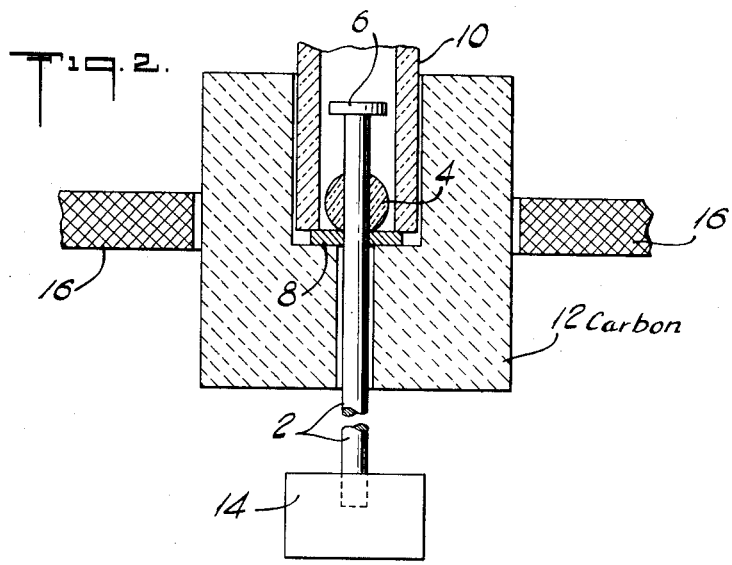
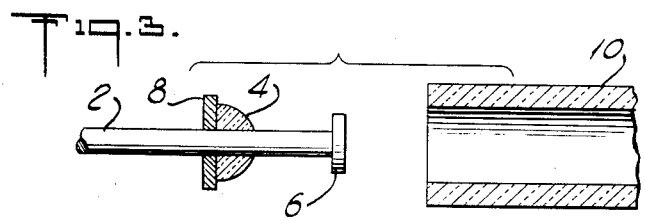
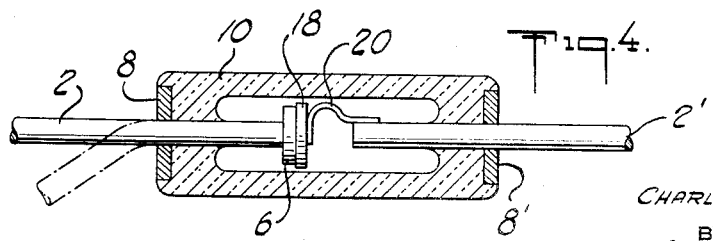
INVENTOR
CHARLES Z. LEINKRAM
BY
Eyre, Mann & Lucas
ATTORNEYS United States Patent Office 2,955,386
Patented Oct. 11, 1960

2,955,386

METHOD OF FORMING A SEAL FOR TUBULAR GLASS ENCLOSURES

Charles Z. Leinkram, Passaic, N.J., assignor to Tung-Sol Electric Inc., a corporation of Delaware Filed Dec. 4, 1956, Ser. No. 626,167

1 Claim. (Cl. 49—81)

The present invention relates to small glass electrical or electronic devices such as crystal diodes for computers or the like and comprises a novel method of sealing a beaded lead to a tubular glass enclosure that insures a better seal and one less subject to breakage than seals formed by methods heretofore in use.

The closures for small glass computer diodes have heretofore been effected by fusing the glass bead carried on the lead to the tubular wall of the enclosure by use of a heated platinum loop. Flexing of the lead about its point of exit from the enclosure tended to set up strains in the adjacent glass of the seal and hence the prior devices were subject to relatively high incidence of breakage. In accordance with the invention a metal washer of suitable soft glass sealing alloy is positioned on the lead adjacent to a glass bead and the end of the tubing which is to be sealed and the bead are fused to the washer by induction heating. The heat transferred from the washer to both the bead and the side walls of the tube causes fusion of the bead and tube and formation of the end wall of the enclosure. The washer remains in place to serve as a fulcrum about which the lead may bend and thereby prevent stresses from being set up in the glass seal when the lead is bent. Preferably, during the sealing operation the lead on which the germanium wafer is to be mounted is placed in a heat sink. The invention can be practiced in one or in two steps.

In the accompanying drawing:

Fig. 1 is an exploded view of parts to be sealed together to form an end closure of a glass enclosed crystal diode;

Fig. 2 shows the same parts about to be fused together to form an end seal in a single step;

Fig. 3 shows the parts of Fig. 1 after completion of one step in a two-step process; and Fig. 4 is a sectional view of a glass enclosed crystal diode with the end seals formed in accordance with the invention.

In Fig. 1 a dumet lead or nail 2 is shown with a glass bead 4 fused thereto and having a head 6 thereon upon which a germanium crystal is to be mounted. In accordance with the invention a washer 8 of metal, such as dumet or other soft alloy suitable for sealing to glass, is slid over the lead 2 on the side remote from the head 6. Also in Fig. 1 is shown one end of the tubular enclosure 10 which is to be closed by the bead 4. The inside diameter of the tube 10 is slightly larger than the outer diameter of the bead 4 and the outside diameter of the washer is smaller than the outer diameter of the tube but greater than the inside diameter of the tube.

In accordance with the preferred method of forming an end closure for the tube 10 of Fig. 1, the lead 2 carrying the washer 8 and having bead 4 fused thereon is placed in a carbon nest 12, as shown in Fig. 2, with the washer resting on the floor of a cylindrical recess therein dimensioned for reception of the end of the tube 10. The bead 4 engages the washer and the end of the lead 2 extends through a vertical passage in the nest and preferably into a heat sink 14. The end of tube 10 is then slid over the bead 4 and into engagement with the washer 8. The carbon nest is then heated inductively by high frequency current in an induction coil, a winding of which is diagrammatically indicated at 16. The carbon of the nest transfres heat to the tube, bead and washer by radiation and by conduction causing fusion of the bead and tube to the washer and to each other, the bead losing its identity and becoming integral with the glass of the tube.

After the parts have been thus fused together, forming an end closure such as shown at each end of the diode of Fig. 4, a crystal 18 of germanium or the like is mounted on the head 6 of the lead. In the case of a gold bonded diode, a gold wire 20 is bonded to the crystal and to the end of a second dumet lead 21 having a glass bead fused thereon and the seal at the other end of the tube is formed in the same manner by fusion of the bead and tube wall to each other and to a metal washer 8'. If the diode is to be a point contact type, the gold wire is omitted and the whisker is welded to the other lead.

Instead of the single step method of forming the seal illustrated in Fig. 2, a two-step process could be employed. In the first step of such process, the washer 8 is brought into contact with the bead 4 and heated by induction heating to fuse the bead thereto. In Fig. 3 the bead is shown fused to the washer. After the bead has been so fused to the washer, the tube 10 is slid over the bead to contact the washer, and the washer again inductively heated. The rim of the washer transfers heat to the glass tubing and the face of the washer fused to the glass bead transfers heat to the bead with the result that the bead and tubular wall are fused together to form a unitary structure such as formed by the one-step process of Fig. 2.

With the completed enclosure as shown in Fig. 4, irrespective of whether the end seals were formed by the single step process of Fig. 2 or by a two-step process, any bending of the leads 2 and 2' at the exit from the device will occur about the washer 8 or 8' as indicated by the dotted line position of lead 2. Thus the washer not only serves as a source of heat during the sealing operation but also in the completed seal, as a fulcrum about which the lead can be flexed. Any stresses set up by the bending of the lead are absorbed by the washer rather than by the glass seal and hence breakage of the diode at the seal is substantially reduced.

The invention has now been described in connection with the manufacture of a crystal diode. Obviously the method is equally applicable to any small tubular glass device through one or both ends of which a lead is to be sealed.

The following is claimed:

The method of sealing a beaded lead of an alloy having substantially the coefficient of expansion of glass to a glass tube to form an end seal thereof which comprises sliding a metal washer over the lead, supporting the washer with the bead in engagement therewith in a recess in a carbon nest, introducing one end of the tube to be sealed into the recess to encompass the bead and engage the washer and then inductively heating the nest to transfer heat to the metal disc and glass bead and to the end wall of the tube to fuse the tube and bead together and each to the washer.

References Cited in the file of this patent
UNITED STATES PATENTS

| | | |
|---|---|---|
| 1,320,114 | Birdsall | Oct. 28, 1919 |
| 2,125,316 | Ronci | Aug. 2, 1938 |
| 2,316,999 | Spencer | Apr. 20, 1943 |
| 2,351,128 | Jeffery | June 13, 1944 |
| 2,432,491 | Thomas | Dec. 9, 1947 |
| 2,477,472 | Herzog | July 26, 1949 |
| 2,520,663 | Tromp | Aug. 29, 1950 |
| 2,568,460 | Nolte | Sept. 18, 1951 |
| 2,670,572 | Smith | Mar. 2, 1954 |
| 2,697,309 | Gates | Dec. 21, 1954 |
| 2,699,594 | Bowne | Jan. 18, 1955 |